(12) United States Patent
Kahara

(10) Patent No.: US 6,886,426 B2
(45) Date of Patent: May 3, 2005

(54) SHIFT LEVER APPARATUS, SHIFT LOCK METHOD, SHIFT LOCK SYSTEM AND VEHICLE

(75) Inventor: Keiji Kahara, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/278,025

(22) Filed: Oct. 23, 2002

(65) Prior Publication Data
US 2003/0087725 A1 May 8, 2003

(30) Foreign Application Priority Data
Oct. 25, 2001 (JP) ........................................ 2001-327899

(51) Int. Cl.⁷ .......................... B60K 20/00; B60K 41/20
(52) U.S. Cl. ...................................... 74/473.21; 477/96
(58) Field of Search .................... 70/237, 247; 701/62; 74/473.21, 473.24, 473.25, 473.26; 477/96, 97

(56) References Cited

U.S. PATENT DOCUMENTS

| | | | | |
|---|---|---|---|---|
| 5,197,356 A | * | 3/1993 | Kobayashi et al. | ............ 477/99 |
| 5,490,585 A | * | 2/1996 | Togano | ........................ 477/96 |
| 5,695,029 A | * | 12/1997 | Yokoyama et al. | ...... 192/219.6 |
| 5,752,414 A | * | 5/1998 | Reasoner et al. | ......... 74/483 R |
| 5,860,303 A | * | 1/1999 | Droz et al. | .................... 70/247 |
| 6,192,770 B1 | * | 2/2001 | Miyoshi et al. | .......... 74/473.18 |
| 2003/0097897 A1 | * | 5/2003 | Yamada et al. | .......... 74/473.21 |

FOREIGN PATENT DOCUMENTS

JP        10297302 A    * 11/1998

* cited by examiner

*Primary Examiner*—Roger Pang
(74) *Attorney, Agent, or Firm*—Nixon Peabody LLP

(57) ABSTRACT

In a shift lever apparatus, a shift position can be changed from a "P" shift position only by turning a shift lever to a right side of a vehicle. Unless a brake is operated, it is possible to maintain a state in which a stopper portion is disposed in a right side of the vehicle in an abutting portion. Therefore, the abutting portion abuts the stopper portion, and the shift lever cannot be turned to the right side of the vehicle. When the brake is operated, a rotary plate is rotated in accordance that the shift lever turns to the right side of the vehicle. Accordingly, the abutting portion does not abut the stopper portion, and the shift lever can be turned to the right side of the vehicle.

10 Claims, 11 Drawing Sheets

SHIFT LEVER APPARATUS, SHIFT LOCK METHOD, SHIFT LOCK SYSTEM AND VEHICLE

BACKGROUND OF THE INVENTION

1. Field of the Invention

The present invention relates to a shift lever apparatus in which a shift position is changed by a shift lever being turned, a shift lock method which limits movement of a shift lever, a shift lock system provided with the shift lever apparatus, and a vehicle provided with the shift lever apparatus.

2. Description of the Related Art

A so-called gate-type shift lever apparatus is provided with a shift lever which can be turned in a longitudinal direction of a vehicle and a lateral direction of the vehicle. In a case when the shift lever is changed from a "P" shift position to an "R" shift position, it is necessary to turn the shift lever, for example, to a right side of the vehicle, a back side of the vehicle and a left side of the vehicle in this order.

Further, this shift lever apparatus is provided with a shift lock mechanism. The structure is made such that in a case when the shift lever is positioned at the "P" shift position, the shift lever can be changed from the "P" shift position to the "R" shift position by means of the shift lock mechanism only by pressing a brake.

Further, the shift lever apparatus is provided with a key interlock mechanism. The structure is made such that unless the shift lever is positioned at the "P" shift position, an ignition key which is inserted to a key cylinder cannot be rotated to a "LOCK" position (the ignition key cannot be taken out from the key cylinder) by the key interlock mechanism.

However, in such a shift lever apparatus, the shift lock mechanism is an electric mechanism. Accordingly, the structure is made such as to switch an inhibition and an allowance of changing the shift lever from the "P" shift position by switching a protrusion (disengagement) and a non-protrusion (suction) of a plunger in a solenoid which is provided in correspondence to the shift lever, on the basis of an electric signal output from a brake. Thus, the electric signal from the brake and the solenoid are required, and there is a problem that a cost is high.

Further, in such a shift lever apparatus, in the case that the key interlock mechanism is constituted by the electric mechanism, the structure is made such that the ignition key is switched to inhibit and allow a rotating operation to the "LOCK" position by switching a protrusion (disengagement) and a non-protrusion (suction) of the plunger in the solenoid which is provided in correspondence to the key cylinder, on the basis of an electric signal output from the shift lever (an ignition switch). Thus, the electric signal from the shift lever and the solenoid are required, and there is a problem that a cost is further high.

SUMMARY OF THE INVENTION

The present invention is made by taking the facts mentioned above into consideration, and an object of the invention is to obtain a shift lever apparatus, a shift lock method, a shift lock system and a vehicle which can reduce costs.

According to a first aspect of the invention, there is provided a shift lever apparatus comprising: a shift lever which is provided so as to be able to be turned in a predetermined direction and a side direction of the predetermined direction, wherein by being turned at least in the side direction of the predetermined direction, a shift position is changed from a predetermined shift position; and a connecting member, which connects the shift lever and a brake for braking a vehicle by being operated and is able to be moved between a first position, at which the turning of the shift lever to the side direction of the predetermined direction is inhibited, and a second position, at which the turning of the shift lever to the side direction of the predetermined direction is allowed, wherein, in a case when the shift lever is positioned at the predetermined shift position, and the brake is not operated, movement from the first position to the second position is inhibited, and in a case when the shift lever is positioned at the predetermined shift position, and the brake is operated, movement from the first position to the second position is allowed, and the connecting member is moved from the first position to the second position in accordance with the turning of the shift lever to the side direction of the predetermined direction.

In the shift lever apparatus according to the first aspect, the shift lever which can be turned in the predetermined direction and the side direction of the predetermined direction is turned at least in the side direction of the predetermined direction, whereby the shift position is changed from the predetermined shift position.

In this case, the shift lever apparatus is provided with a shift lock mechanism. Unless the brake is operated in a case when the shift lever is positioned at the predetermined shift position, the connecting member disposed at the first position is inhibited from moving to the second position. Accordingly, the shift lever is inhibited from turning to the side direction of the predetermined direction, and the shift lever is inhibited from being changed from the predetermined shift position.

On the contrary, if the brake is operated in a case when the shift lever is positioned at the predetermined shift position, the connecting member disposed at the first position is allowed to move to the second position, and the connecting member is moved from the first position to the second position in accordance that the shift lever is turned to the side direction of the predetermined direction. Accordingly, the shift lever is allowed to turn to the side direction of the predetermined direction, and the shift lever is allowed to be changed from the predetermined shift position.

Therefore, the shift lock mechanism can be constituted by a mechanical mechanism. Thus, the electric signal output from the brake and the solenoid in the conventional art are not required, and it is possible to reduce a cost.

A second aspect of the invention provides a shift lever apparatus according to the first aspect, wherein the connecting member connects the shift lever and an ignition key which can be taken out by being operated to a predetermined operating position, and, in a case when the shift lever is positioned at the predetermined shift position, the operation of the ignition key to the predetermined operating position is allowed by the connecting member being disposed at the first position, and in a case when the shift lever is positioned at a position other than the predetermined shift position, the operation of the ignition key to the predetermined operating position is inhibited by the connecting member being disposed at the second position.

In the shift lever apparatus according to the second aspect, the shift lever apparatus is provided with a key interlock mechanism. In a case when the shift lever is positioned at the predetermined shift position, the connecting member is disposed at the first position, thereby allowing the ignition key to be operated to the predetermined operating position (the ignition key to be taken out).

On the contrary, in a case when the shift lever is positioned at the other positions than the predetermined shift position, the connecting member is disposed at the second position, thereby inhibiting the ignition key from being operated to the predetermined operating position (the ignition key from being taken out).

Accordingly, the key interlock mechanism can be constituted by a mechanical mechanism. Thus, the electric signal output from the shift lever and the solenoid in the conventional art are not required, and it is possible to further reduce the cost.

Further, since the connecting member can be commonly used as the shift lock mechanism, it is possible to ever further reduce the cost.

A third aspect of the invention provides a shift lever apparatus according to the first aspect, wherein a moving force from the first position toward the second position is applied to the connecting member.

In the shift lever apparatus according to the third aspect, the moving force from the first position toward the second position is applied to the connecting member. Accordingly, in a case when the shift lever is positioned at the other positions than the predetermined shift position, it is possible to be securely disposed the connecting member at the second position due to this moving force.

Therefore, it is possible to prevent the turning of the shift lever from being inhibited in a case when the shift lever is changed to the predetermined shift position. Further, for this reason, in the case that the shift lever apparatus is provided with the key interlock mechanism, it is possible to securely inhibit the ignition key from being operated to the predetermined operating position.

A fourth aspect of the invention provides a shift lever apparatus according to the first aspect, further comprising a shift lock member, which is jointed to a shift lever side of the connecting member, for inhibiting the shift lever from turning to the side direction of the predetermined direction in a case when the connecting member is disposed at the first position and for allowing the shift lever to turn in the side direction of the predetermined direction in a case when the connecting member is disposed at the second position.

In the shift lever apparatus according to the fourth aspect, in a case when the connecting member is disposed at the first position, the shift lock member, which is jointed to the shift lever side of the connecting member, inhibits the shift lever from turning to the side direction of the predetermined direction. On the contrary, in a case when the connecting member is disposed at the second position, the shift lock member allows the shift lever to turn to the side direction of the predetermined direction. Accordingly, in a case when the shift lever is positioned at the predetermined shift position, it is possible to securely inhibit the shift lever from being changed from the predetermined shift position in a state in which the brake is not operated, and on the contrary, it is possible to securely allow the shift lever to be changed from the predetermined shift position in a state in which the brake is operated.

According to the invention, there is provided a shift lock method for use with a shift lever which is provided so as to be able to be moved in a predetermined direction and a different direction from the predetermined direction and is moved at least in the different direction to change a shift position from a predetermined shift position, the shift lock method comprising the steps of: inhibiting the movement of the shift lever in the different direction with a shift lock mechanism, which is connected to a brake for being operated to stop a vehicle and is constituted a mechanical mechanism, in a case when the shift lever is positioned at the predetermined shift position and the brake is not operated; and allowing the movement of the shift lever in the different direction with the shift lock mechanism in a case when the shift lever is positioned at the predetermined shift position and the brake is operated.

A shift lock system according to the invention is provided with a brake for being operated to brake a vehicle, and the shift lever apparatus according to the first aspect.

A vehicle according to the invention is provided with the shift lock system according to the invention.

DESCRIPTION OF THE PREFERRED EMBODIMENTS

[First Embodiment]

Figure 1:
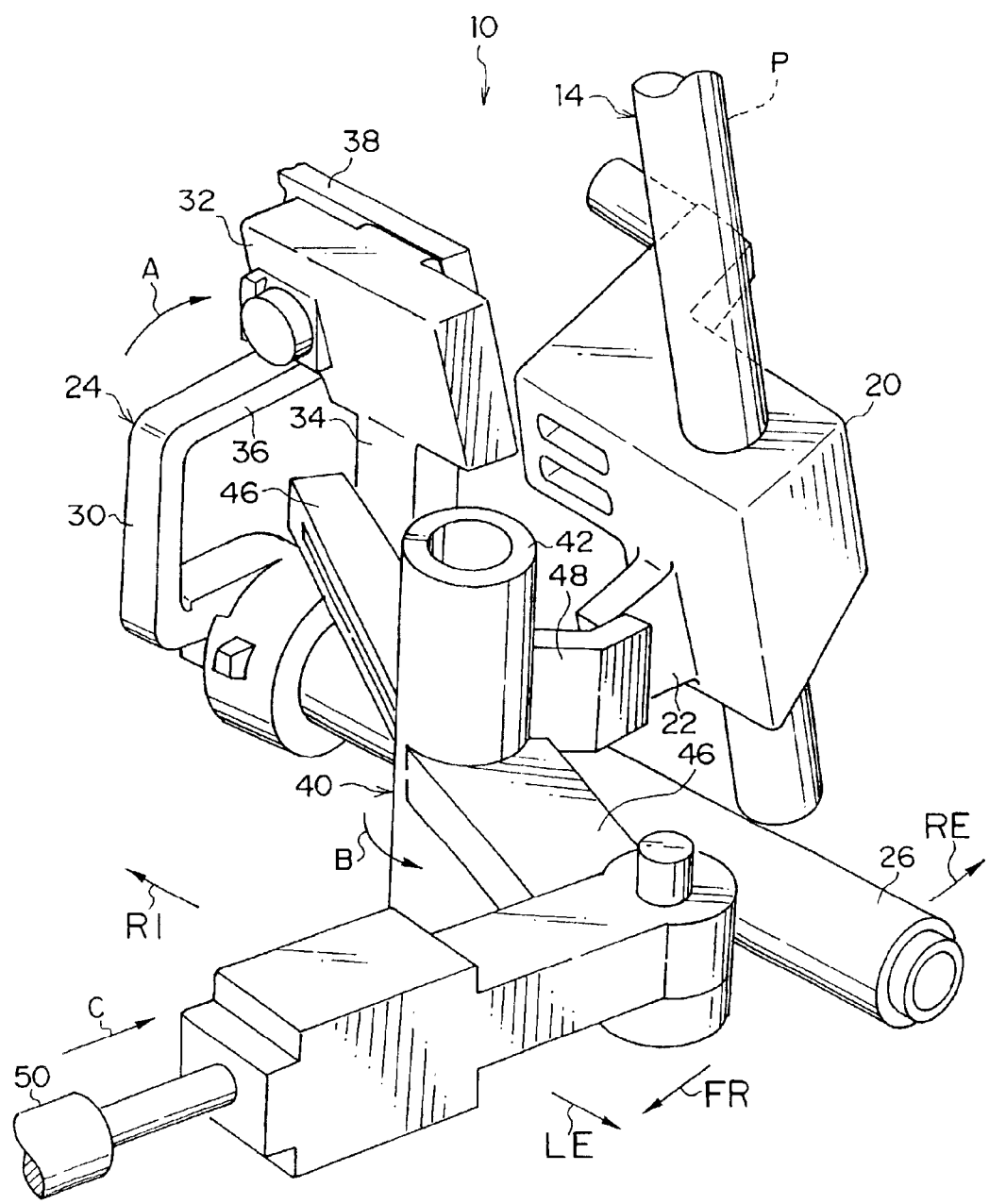
FIG. 1 is a perspective view as seen from a left oblique front side of a vehicle which shows a main portion of a shift lever apparatus according to a first embodiment.
Figure 2:
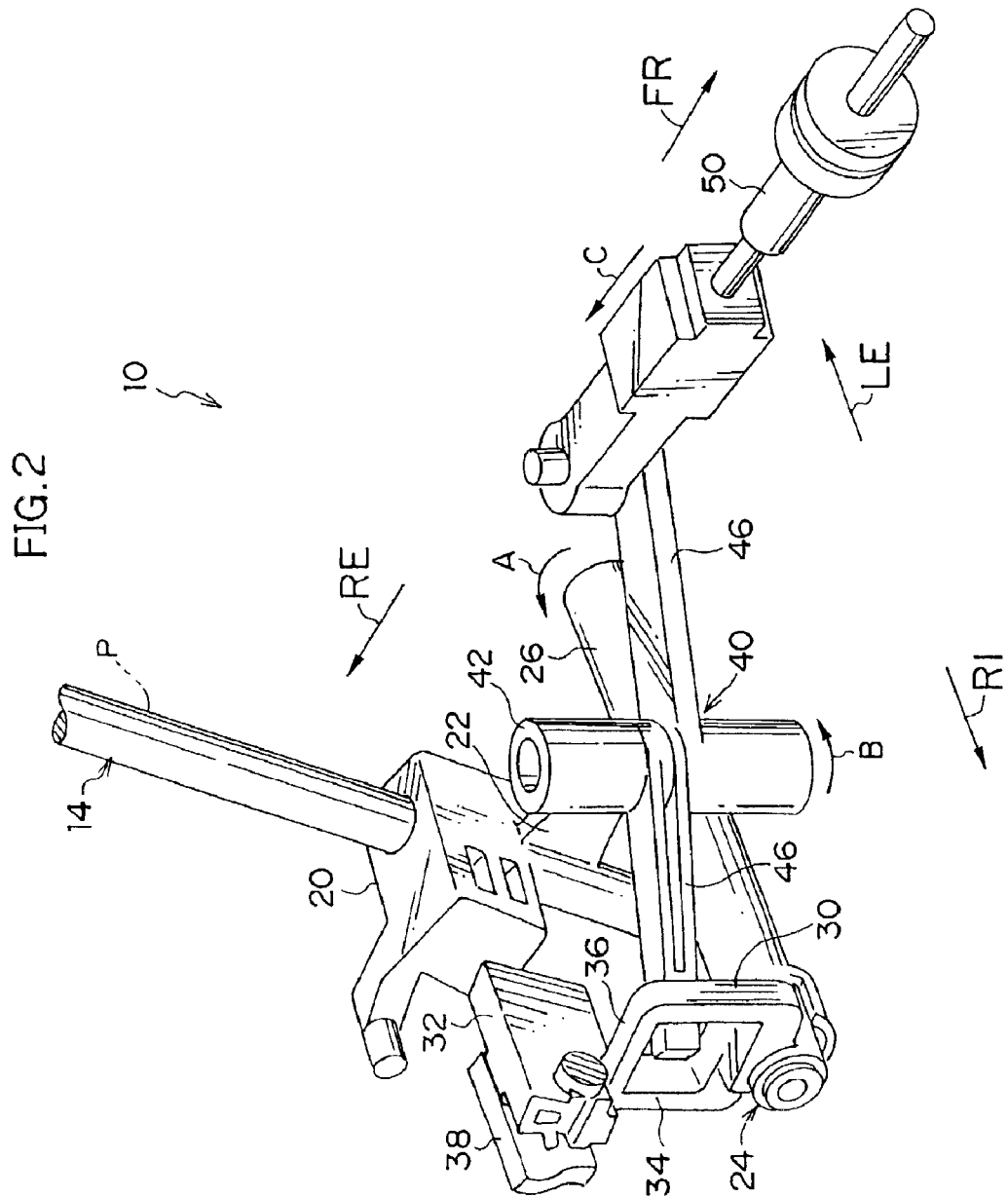
FIG. 2 is a perspective view as seen from a right oblique front side of the vehicle which shows the main portion of the shift lever apparatus according to the first embodiment.

In FIG. 1, there is shown a main portion of a shift lever apparatus 10 according to a first embodiment of the present invention in a form of a perspective view as seen from a left oblique front side of a vehicle. In FIG. 2, there is shown the main portion of the shift lever apparatus 10 in a form of a perspective view as seen from a right oblique front side of the vehicle. In this case, in the drawings, a front side of the vehicle is shown by an arrow FR, a rear side of the vehicle is shown by an arrow RE, a left side of the vehicle is shown by an arrow LE, and a right side of the vehicle is shown by an arrow RI.

The shift lever apparatus 10 according to the present embodiment is of a so-called gate type, and is placed on a floor surface 12 (refer FIG. 6) within the vehicle.

The shift lever apparatus 10 is provided with a shift lever 14. The shift lever 14 is structured such as to be able to turn in a longitudinal direction (a predetermined direction) of the vehicle and a lateral direction of the vehicle.

Figure 6:
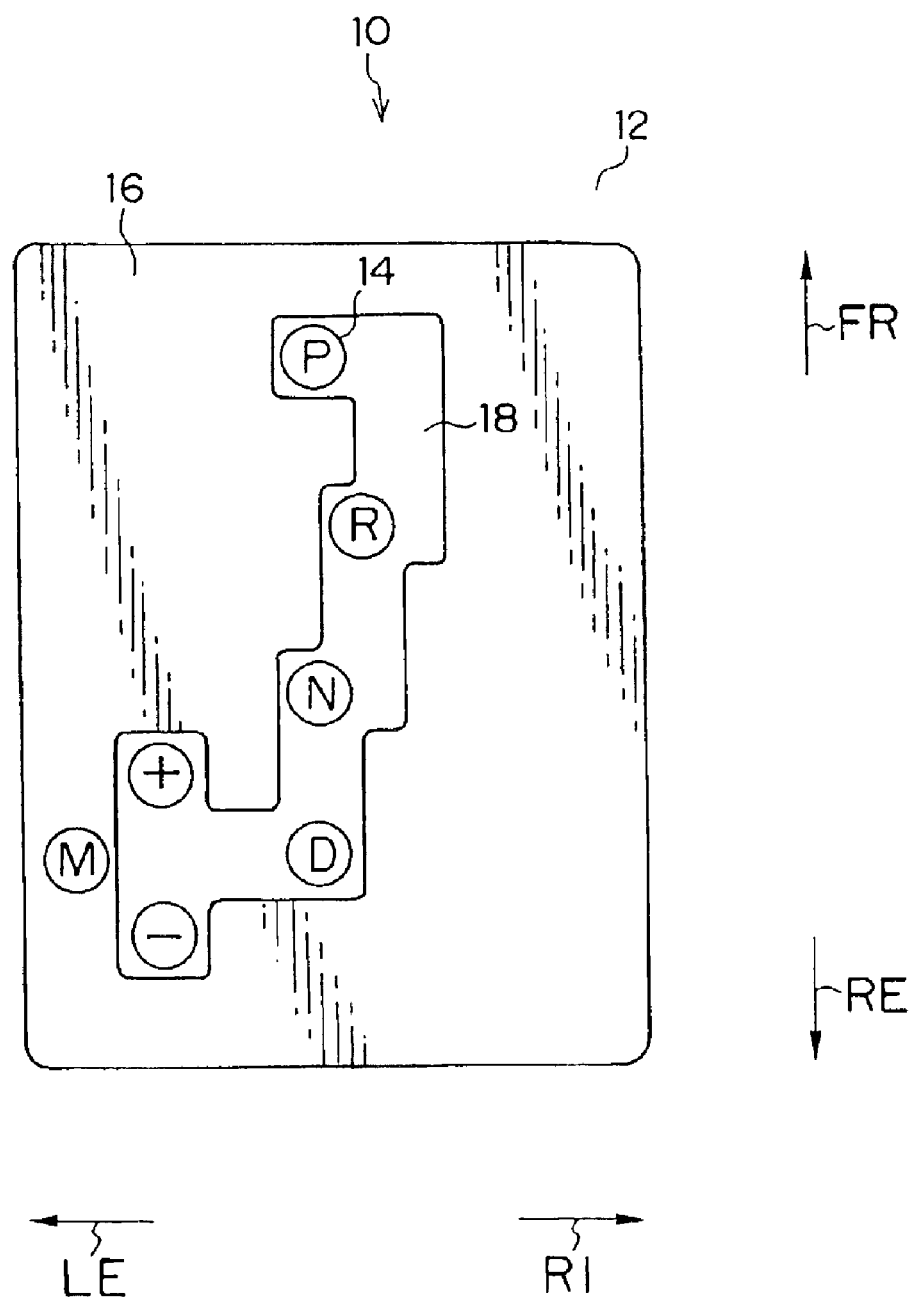
FIG. 6 is a plan view which shows a housing in the shift lever apparatus according to the first embodiment.

As shown in FIG. 6, the shift lever apparatus 10 is provided with a box-like housing 16 in which a lower surface is open. A guide hole 18 is formed on an upper surface of the housing 16. The guide hole 18 is formed in a predetermined bent shape. The shift lever 14 is inserted through the guide hole 18. The shift lever 14 is positioned at a "P" shift position which corresponds to a predetermined shift position. The shift lever 14 is guided from the "P" shift position by the guide hole 18 so as to be turned to the longitudinal direction of the vehicle or the lateral direction of the vehicle, thereby being changed to the other shift positions (in the present embodiment, an "R" shift position, a "N" shift position, a "D" shift position and a "+" shift position and a "−" shift position in a manual mode). In particular, in a case when the shift lever 14 is changed from the "P" shift position to the "R" shift position, it is necessary to turn the shift lever 14 to the right side of the vehicle (a side direction (a select direction) of the predetermined direction), the rear side of the vehicle and the left side of the vehicle in this order.

An abutting portion 20 formed in a rectangular parallelepiped shape is integrally provided in a lower portion (a portion within the housing 16) of the shift lever 14. The abutting portion 20 moves together with the turning of the shift lever 14. A quadrangular pressed plate 22 serving as a returning member is integrally provided in the abutting portion 20. The pressed plate 22 protrudes to the front side of the vehicle from the abutting portion 20.

Figure 4:
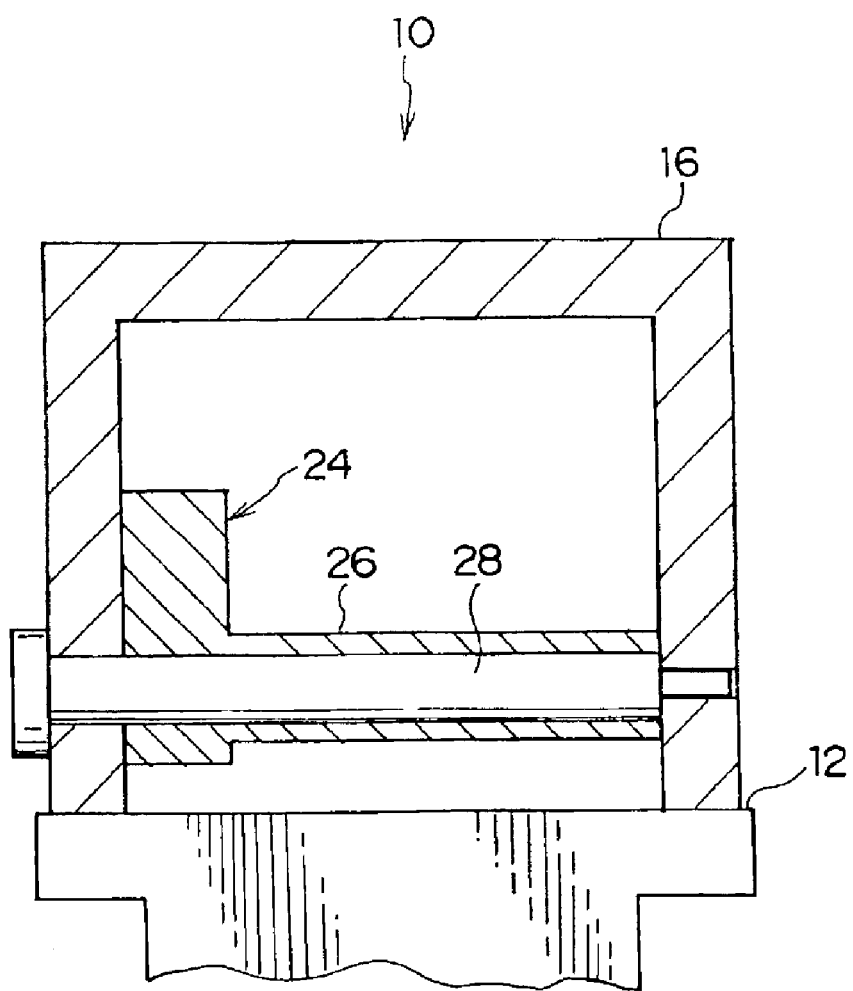
FIG. 4 is a sectional view which shows a supporting state of a stopper link in the shift lever apparatus according to the first embodiment.

A stopper link 24 constituting the shift lock member is disposed in the front side of the vehicle in the shift lever 14. A cylinder portion 26 is provided in the stopper link 24. A columnar supporting pin 28 which is bridged between a right side wall of the vehicle and a left side wall of the vehicle in the housing 16 is inserted into the cylinder portion 26, as shown in FIG. 4. Accordingly, the cylinder portion 26 is disposed in parallel to the lateral direction of the vehicle. Further, the stopper link 24 is made freely rotate around the supporting pin 28.

An engagement portion 30 formed in a square pole shape is supported to a right end portion of the vehicle in the cylinder portion 26. The engagement portion 30 is structured such as to be able to integrally rotate with the cylinder portion 26. Further, a stopper portion 32 formed in a rectangular parallelepiped shape and serving as a stopper member is supported to the right end portion of the vehicle in the cylinder portion 26, in the rear side of the vehicle of the engagement portion 30, via a supporting rod 34. The stopper portion 32 is structured such as to be able to integrally rotate with the cylinder portion 26. A reinforcing rod 36 formed in a square pole shape is bridged between a top end of the engagement portion 30 and the stopper portion 32. The support of the engagement portion 30 and the stopper portion 32 by the cylinder portion 26 is reinforced by the reinforcing rod 36.

The stopper link 24 is energized toward a direction of an arrow A in FIGS. 1 and 2. According to this energizing force, the stopper portion 32 abuts a protruding plate 38 which is protruded to the left side of the vehicle from the right side wall of the vehicle in the housing 16. Accordingly, the stopper portion 32 is disposed in the right side of the vehicle in the abutting portion 20 of the shift lever 14. The abutting portion 20 abuts the stopper portion 32 in this state, whereby it is possible to inhibit the shift lever 14 from turning to the right side of the vehicle from the "P" shift position. Further, in a case when the stopper link 24 is rotated in a direction opposing to the direction of the arrow A as mentioned below, the abutting portion 20 does not abut the stopper portion 32. Therefore, the shift lever 14 is allowed to turn to the right side of the vehicle from the "P" shift position.

Figure 5:
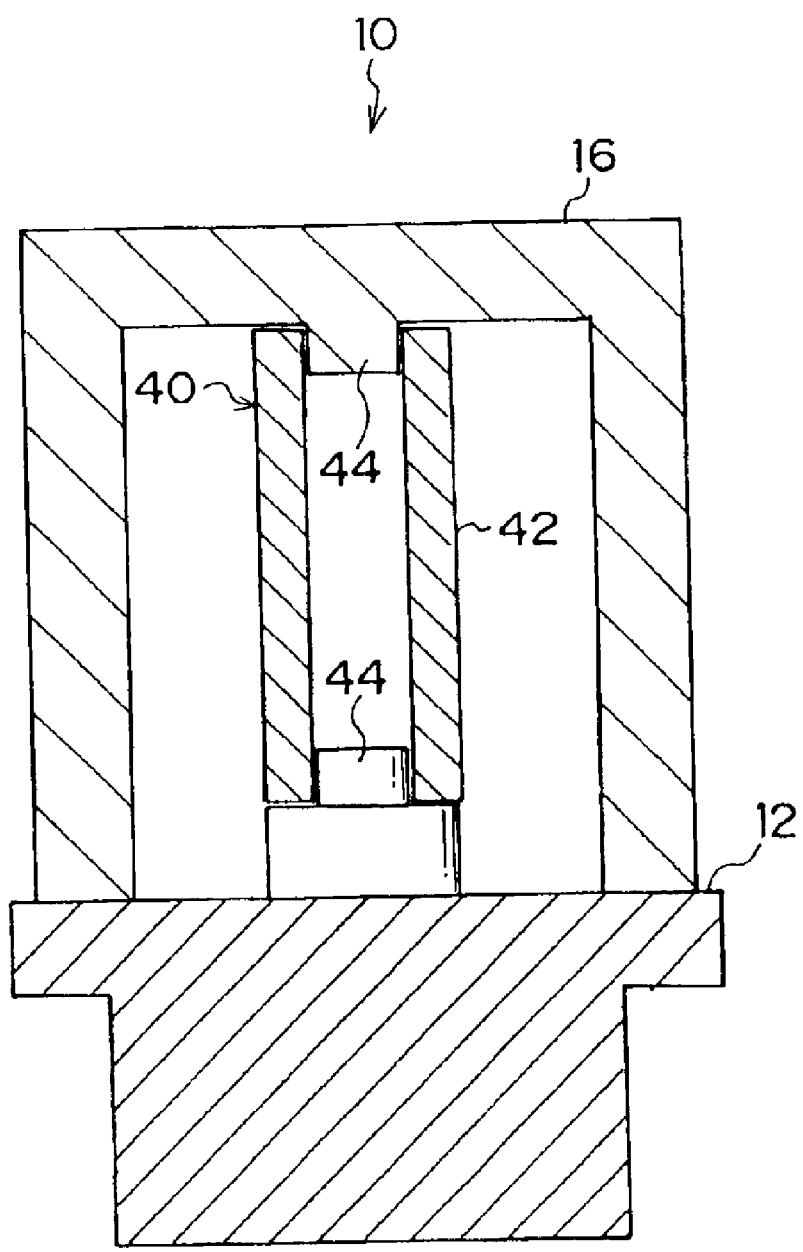
FIG. 5 is a sectional view which shows a supporting state of a cable link in the shift lever apparatus according to the first embodiment.

A cable link 40 constituting a shift lock member as a moving mechanism, a disposing mechanism and a joint member is disposed in the front side of the vehicle in the shift lever 14. A cylindrical supporting tube 42 is provided in the cable link 40. As shown in FIG. 5, columnar supporting projections 44 which are respectively provided in an upper wall of the housing 16 and a floor surface 12 within the vehicle are inserted to both end portions of the supporting tube 42. Accordingly, the supporting tube 42 is disposed in parallel to the vertical direction. Further, the cable link 40 is structured such as to freely rotate around a pair of the supporting projections 44.

A rotary plate 46 formed in a long plate shape is supported to the supporting tube 42. The rotary plate 46 is horizontally disposed with setting the supporting tube 42 to a substantially center. The rotary plate 46 is structured such as to be able to integrally rotate with the supporting tube 42. Further, a pressing plate 48 formed in a bent plate shape is integrally provided in the rear portion of the vehicle in the supporting tube 42. The pressing plate 48 protrudes out to the rear side of the vehicle from the supporting tube 42.

The cable link 40 is energized toward a direction of an arrow B in FIGS. 1 and 2. According to this energizing force, the pressing plate 48 abuts the pressed plate 22 of the shift lever 14. Therefore, one end (a right end of the vehicle) of the rotary plate 46 is disposed between the engagement portion 30 and the stopper portion 32 of the stopper link 24.

One end of a cable 50 corresponding to a connecting member is rotatably jointed to another end (a left end of the vehicle) of the rotary plate 46. A moving force toward a direction of an arrow C in FIGS. 1 and 2 (a side of the shift lever 14) is applied to the cable 50 due to the energizing force applied to the cable link 40. Further, the cable 50 is disposed at a position in a side opposing to the arrow C (a position shown in FIGS. 1 and 2) which corresponds to a first position. The cable 50 is structured such that the cable 50 can move to a position in a side of the arrow C which corresponds to a second position, from the position in the side opposing to the arrow C in correspondence to a rotation of the cable link 40 in the direction of the arrow B. In a case when the cable 50 is disposed at the position in the side of the arrow C, one end of the rotary plate 46 presses the engagement portion 30 of the stopper link 24, and the stopper link 24 is rotated in the direction opposing to the arrow A. Further, the cable 50 is structured such that the cable 50 cannot move in the direction of the arrow C over the position in the side of the arrow C.

Figure 3:
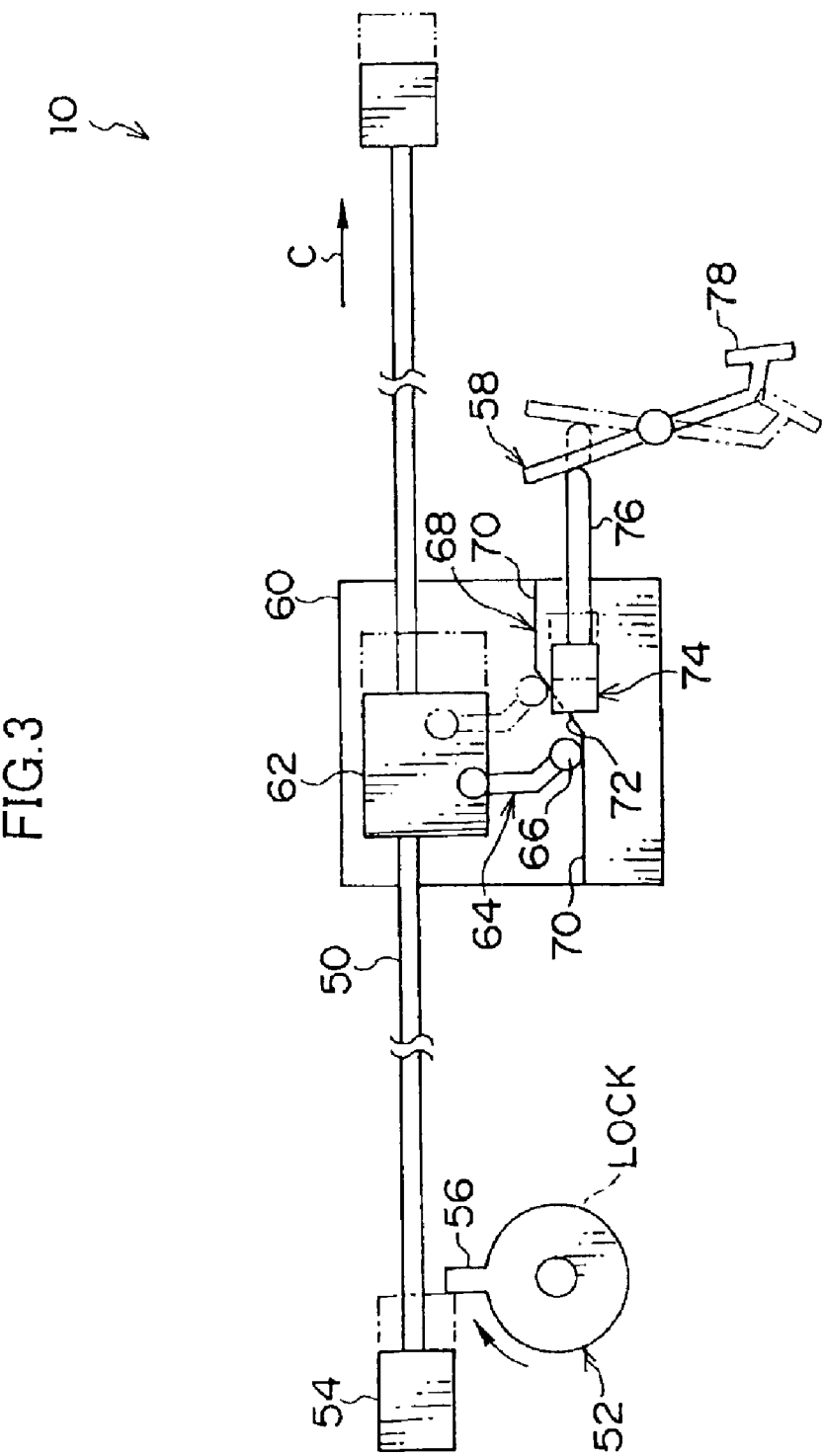
FIG. 3 is a schematic view which shows a connection state of a cable in the shift lever apparatus according to the first embodiment.

As shown in FIG. 3, the cable 50 connects the shift lever 14 and an ignition key (not shown). Another end of the cable 50 is disposed near a key cylinder 52 to which the ignition key is inserted. A key lock member 54 is fixed to the other end of the cable 50. The key lock member 54 moves in a direction moving close to the key cylinder 52 together with a movement of the cable 50 in the direction of the arrow C (the side of the shift lever 14).

The key cylinder 52 is rotated together with a rotating operation of the ignition key. Further, in a case when the ignition key is rotated to a "LOCK" position (a predetermined operating position), the ignition key can be taken out (removed) from the key cylinder 52. An engagement projection 56 is provided in the key cylinder 52. The engagement projection 56 is integrally rotated with the rotation of the key cylinder 52. In this case, the cable 50 is disposed at the position in the side opposing to the arrow C as mentioned above. Accordingly, the engagement projection 56 does not abut the key lock member 54, and a rotating operation of the ignition key to the "LOCK" position is allowed. On the contrary, in a case when the cable 50 is disposed at the position in the side of the arrow C, the engagement projection 56 abuts the key lock member 54. Accordingly, the rotating operation of the ignition key to the "LOCK" position is inhibited.

The cable 50 also connects the shift lever 14 and the brake 58. The cable 50 is inserted into a case 60 which is provided in the side opposing to the arrow C in the brake 58 and serves as an inhibiting mechanism. A moving member 62 is fixed to the cable 50 within the case 60. The moving member 62 integrally moves with the movement of the cable 50. An upper end of a supporting member 64 is supported to the moving member 62. The supporting member 64 is structured such as to freely move upward and downward with respect to the moving member 62. A pulley 66 is supported to a lower end of the supporting member 64. The pulley 66 is structured such as to freely rotate.

A guiding surface 68 is provided within the case 60. The guiding surface 68 has a pair of horizontal surfaces 70, and a slant surface 72 which is provided between a pair of horizontal surfaces 70 and is inclined upward toward the direction of the arrow C. The pulley 66 of the supporting member 64 is disposed on the guiding surface 68. In this case, the cable 50 is disposed at the position in the side opposing to the arrow C as mentioned above. Accordingly, the pulley 66 of the supporting member 64 is disposed on the horizontal surface 70 in a lower side. On the contrary, in a case when the cable 50 is disposed at the position in the side of the arrow C, the supporting member 64 is moved upward with respect to the moving member 62, and the pulley 66 of the supporting member 64 moves upward on the slant surface 72 so as to be disposed on an upper portion of the slant surface 72 (or the horizontal surface 70 in an upper side).

An inhibiting member 74 is provided within the case 60, in the side of the arrow C of the slant surface 72. A rod-like extension portion 76 is integrally provided in the inhibiting member 74. The extension portion 76 is extended out of the case 60 toward the brake 58 (the side of the arrow C). The inhibiting member 74 is energized toward the brake 58. A substantially middle portion of the brake 58 in the vertical direction is rotatably supported to the vehicle. The extension portion 76 abuts the upper portion of the brake 58 according to the energizing force. The lower portion of the brake 58 is constituted by an operation portion 78. The vehicle is braked by pressing the operation portion 78.

In a case when the operation portion 78 is not pressed, the inhibiting member 74 protrudes out from the slant surface 72. Therefore, the pulley 66 of the supporting member 64 abuts the inhibiting member 74, and the pulley 66 is inhibited from moving to the upper side of the slant surface 72. Accordingly, the cable 50 disposed at the position in the side opposing to the arrow C is inhibited from moving to the position in the side of the arrow C. On the contrary, in a case when the operation portion 78 of the brake 58 is pressed, the extension portion 76 follows the rotation of the upper portion of the brake 58 according to the energizing force. Accordingly, the inhibiting member 74 moves to the side of the brake 58 so as not to protrude from the slant surface 72, and the pulley 66 of the supporting member 64 is allowed to move to the upper side of the slant surface 72. Therefore, the structure is made such that the cable 50 disposed at the position in the side opposing to the arrow C is allowed to move to the position to the side of the arrow C.

Further, a shift lock system is constructed by the shift lever apparatus 10, the brake 58, the key cylinder 52 and the like.

Next, a description will be given of an operation of the present embodiment.

In the shift lever apparatus 10 of the structure mentioned above, the shift lever 14 which can be turned in the longitudinal direction of the vehicle and the lateral direction of the vehicle is turned to the right side of the vehicle (a select direction), the rear side of the vehicle and the left side of the vehicle in this order, whereby the shift position is changed from the "P" shift position to the "R" shift position.

In this case, this shift lever apparatus 10 is provided with a shift lock mechanism. According to a shift lock method of the shift lever apparatus 10, the inhibiting member 74 protrudes from the slant surface 72 unless the operation portion 78 of the brake 58 is not pressed in a case when the shift lever 14 is positioned at the "P" shift position. Accordingly, the pulley 66 of the supporting member 64 abuts the inhibiting member 74, the pulley 66 is inhibited from moving to the upper side of the slant surface 72, and the cable 50 disposed at the position in the side opposing to the arrow C is inhibited from moving to the position in the side of the arrow C. Accordingly, the cable link 40 is inhibited from rotating in the direction of the arrow B according to the energizing force. Therefore, it is possible to maintain the state in which one end (the right end of the vehicle) in the rotary plate 46 of the cable link 40 is disposed between the engagement portion 30 and the stopper portion 32 of the stopper link 24, and the state in which the stopper portion 32 of the stopper link 24 is disposed in the right side of the vehicle in the abutting portion 20 of the shift lever 14. Accordingly, the abutting portion 20 abuts the stopper portion 32, whereby the shift lever 14 is inhibited from turning to the right side of the vehicle. Therefore, the shift lever 14 is inhibited from being changed from the "P" shift position to the "R" shift position.

On the contrary, the inhibiting member 74 moves to the side of the brake 58 according to the energizing force together with the rotation of the upper portion of the brake 58 and does not protrude from the slant surface 72 if the operation portion 78 of the brake 58 is pressed in a case when the shift lever 14 is positioned at the "P" shift position. Accordingly, the pulley 66 of the supporting member 64 is allowed to move to the upper side of the slant surface 72, and the cable 50 disposed at the position in the side opposing to the arrow C is allowed to move to the position in the side of the arrow C. Accordingly, the cable link 40 is allowed to rotate according to the energizing force. Therefore, the pressing plate 48 of the cable link 40 follows the movement of the pressed plate 22 in the shift lever 14 to the right side of the vehicle which is generated together with the turning of the shift lever 14 from the "P" shift position to the right side of the vehicle, and the cable link 40 rotates in the direction of the arrow B (at the same time, the cable 50 is moved to the position in the side of the arrow C from the position in the side opposing to the arrow C). Accordingly, one end of the rotary plate 46 in the cable link 40 presses the engagement portion 30 of the stopper link 24, and the stopper link 24 is rotated in the direction opposing to the arrow A. Therefore, the abutting portion 20 of the shift lever 14 does not abut the stopper portion 32 of the stopper link 24, and the shift lever 14 is allowed to be turned to the right side of the vehicle. Accordingly, the shift lever 14 is allowed to be changed from the "P" shift position to the "R" shift position.

Therefore, the shift lock mechanism can be constituted by a mechanical mechanism. Accordingly, the electric signal output from the brake and the solenoid in the conventional art are not required, and it is possible to reduce a cost.

Further, in a case when the cable 50 is disposed at the position in the side opposing to the arrow C, the stopper portion 32 of the stopper link 24 which is provided in the side of the shift lever 14 in the cable 50 inhibits the shift lever 14 from turning to the right side of the vehicle. On the contrary, in a case when the cable 50 is disposed at the position in the side of the arrow C, the stopper portion 32 of the stopper link 24 allows the shift lever 14 to turn to the right side of the vehicle. Accordingly, in a case when the shift lever 14 is positioned at the "P" shift position, it is possible to securely inhibit the shift lever 14 from being changed from the "P" shift position in a state in which the operation portion 78 of the brake 58 is not pressed, and on the contrary, it is possible to securely allow the shift lever 14 to be changed from the "P" shift position in a state in which the operation portion 78 of the brake 58 is pressed.

Further, in this case, the shift lever apparatus 10 is provided with a key interlock mechanism. In a case when the shift lever 14 is positioned at the "P" shift position, the pressed plate 22 of the shift lever 14 abuts the pressing plate 48 of the cable link 40, and the cable 50 is disposed at the position in the side opposing to the arrow C. Therefore, the engagement projection 56 of the key cylinder 52 does not abut the key lock member 54 at the other end of the cable 50, and the ignition key is allowed to be rotated to the "LOCK" position. Accordingly, the ignition key can be taken out from the key cylinder 52.

On the contrary, in a case when the shift lever 14 is positioned at the other positions than the "P" shift position, the pressed plate 22 of the shift lever 14 does not abut the pressing plate 48 of the cable link 40. Accordingly, the cable 50 is disposed at the position in the side of the arrow C according to the moving force of the cable 50 toward the direction of the arrow C which is generated by the energizing force toward the direction of the arrow B applied to the cable link 40. Therefore, the engagement projection 56 of the key cylinder 52 abuts the key lock member 54 at the other end of the cable 50, and the ignition key is inhibited from rotating to the "LOCK" position. Therefore, the ignition key cannot be taken out from the key cylinder 52.

Accordingly, the key interlock mechanism can be constituted by a mechanical mechanism. Therefore, the electric signal output from the shift lever and the solenoid according to the conventional art are not required, and it is possible to further reduce the cost.

Further, since the cable 50 can be commonly used as the shift lock mechanism, it is possible to ever further reduce the cost.

Furthermore, the moving force toward the direction of the arrow C is applied to the cable 50 by applying the energizing force toward the direction of the arrow B to the cable link 40. Therefore, in a case when the shift lever 14 is positioned at the other positions than the "P" shift position, it is possible to securely dispose the cable 50 at the position in the side of the arrow C according to this moving force.

Accordingly, in a case when the shift lever 14 is positioned at the other positions than the "P" position, the stopper link 24 can be securely rotated in the direction opposing to the arrow A, and the abutting portion 20 of the shift lever 14 does not abut the stopper portion 32 of the stopper link 24. Thus, it is possible to prevent the turning of the shift lever 14 from being inhibited in a case when the shift lever 14 is changed from the "R" shift position to the "P" shift position.

Further, for this reason, in a case when the shift lever 14 is positioned at the other positions than the "P" shift position, the engagement projection 56 of the key cylinder 52 securely abuts the key lock member 54 at the other end of the cable 50. Therefore, it is possible to securely inhibit the rotating operation of the ignition key to the "LOCK" position.

Further, in a case when turning the shift lever 14 to the left side of the vehicle for the purpose of changing the shift lever 14 from the "R" shift position to the "P" shift position, the pressed plate 22 of the shift lever 14 presses the pressing plate 48 of the cable link 40 to the left side of the vehicle according to the turning of the shift lever 14 to the left side of the vehicle. Accordingly, the cable link 40 is rotated in the direction opposing to the arrow B against the energizing force (at the same time, the cable 50 is moved to the position in the side opposing to the arrow C from the position in the side of the arrow C). Thus, one end of the rotary plate 46 in the cable link 40 is moved to the rear side of the vehicle, and the stopper link 24 is rotated in the direction of the arrow A according to the energizing force. Therefore, the stopper portion 32 of the stopper link 24 abuts the extension plate 38, and the stopper portion 32 is disposed in the right side portion of the vehicle in the abutting portion 20 of the shift lever 14.

Figure 7:
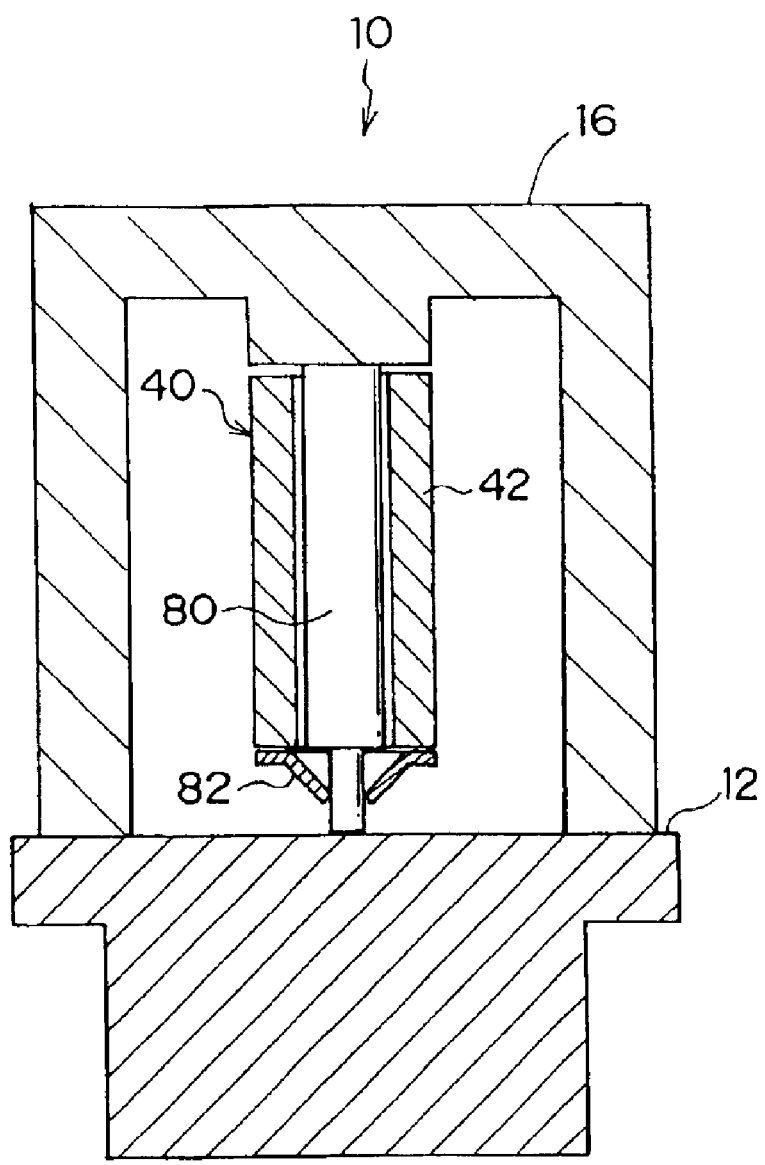
FIG. 7 is a sectional view which shows another example of the supporting state of the cable link in the shift lever apparatus according to the first embodiment.

In this case, in the present embodiment, the structure is made such that the supporting tube 42 of the cable link 40 is supported by the pair of supporting projections 44 as shown in FIG. 5. However, the structure supporting the supporting tube 42 of the cable link 40 may be constituted by a structure shown in FIG. 7. That is, in the structure shown in FIG. 7, a columnar supporting pin 80 is bridged between the upper wall of the housing 16 and the floor surface 12 within the vehicle. The supporting pin 80 is inserted into the supporting tube 42, and the lower end of the supporting tube 42 is supported to a washer 82 which is fixed to the supporting pin 80. Accordingly, the supporting tube 42 is disposed in parallel to the vertical direction. Further, the cable link 40 is structured such as to freely rotate around the supporting pin 80.

(Second Embodiment)

Figure 8:
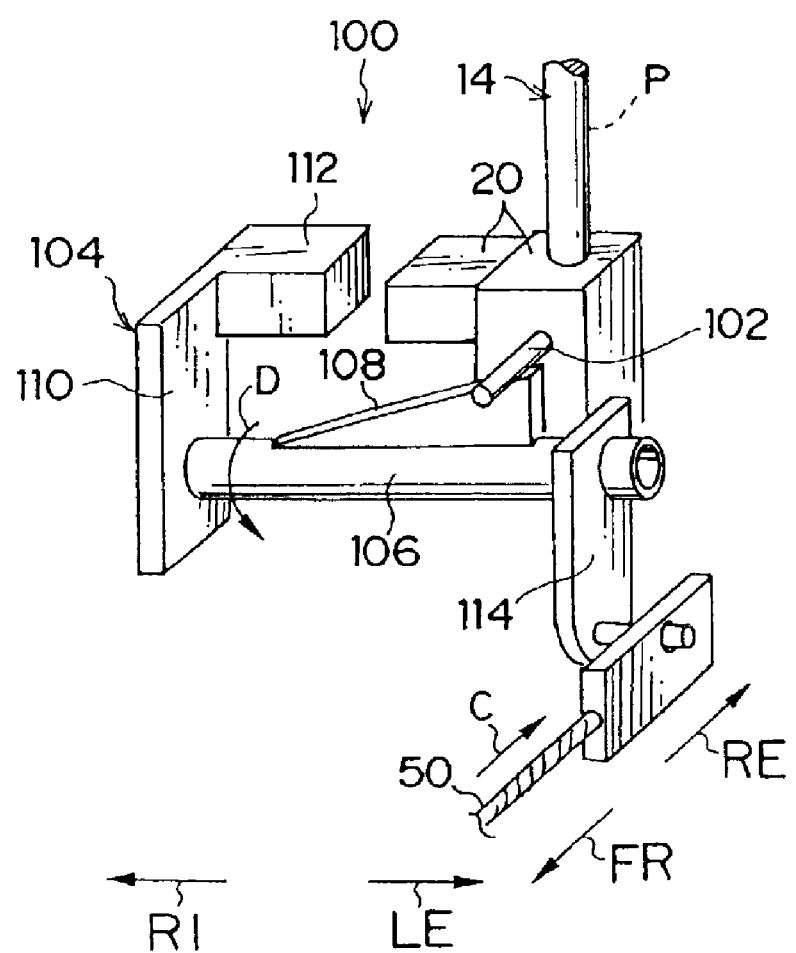
FIG. 8 is a perspective view as seen from a left oblique front side of a vehicle which shows a main portion of a shift lever apparatus according to a second embodiment.

In FIG. 8, there is shown a main portion of a shift lever apparatus 100 according to a second embodiment of the invention in a form of a perspective view as seen from a left oblique front side of a vehicle.

The shift lever apparatus 100 according to the present embodiment has substantially the same structure as that of the shift lever apparatus 10 according to the first embodiment mentioned above, however, is different in the following points.

In place of the pressed plate 22 according to the first embodiment, a columnar pressed rod 102 corresponding to the returning member is integrally provided in the abutting portion 20 in the lower portion of the shift lever 14. The pressed rod 102 protrudes to the front side of the vehicle from the abutting portion 20, above a cylinder portion 106 mentioned below.

In place of the stopper link 24 and the cable link 40 according to the first embodiment, a shift lock member 104 corresponding to the moving mechanism and the disposing mechanism is disposed in the front side of the vehicle in the shift lever 14. The cylindrical cylinder portion 106 is provided in the shift lock member 104. The cylinder portion 106 is supported to the housing 16 by the same structure as the supporting structure for the cylinder portion 26 of the stopper link 24 shown in FIG. 4. Accordingly, the cylinder portion 106 is disposed in parallel to the lateral direction of the vehicle. Further, the shift lock member 104 is allowed to freely rotate around the supporting pin 28. Further, the shift lock member 104 is energized toward a direction of an arrow D in FIG. 8.

A triangular cam plate 108 is integrally provided in an upper portion of the cylinder portion 106 along the lateral direction of the vehicle. An upper surface of the cam plate 108 is formed in a slope surface which is inclined downward toward the right side of the vehicle. A left end portion in the vehicle of the upper surface of the cam plate 108 abuts the pressed rod 102 of the shift lever 14 which is positioned at the "P" shift position, according to an energizing force applied to the shift lock member 104.

Further, the cam plate 108 is disposed at a position which is displaced to the rear side of the vehicle with respect to a center axis of the cylinder portion 106. Accordingly, in a case when the pressed rod 102 of the shift lever 14 moves to the left side of the vehicle so as to press the upper surface of the cam plate 108, the shift lock member 104 is able to rotate in the direction opposing to the arrow D against the energizing force. Further, the upper surface of the cam plate 108 is inclined downward toward the rear side of the vehicle so that an angle of incline becomes greater step by step in accordance that the upper surface is close to the right side of the vehicle. Therefore, the pressed rod 102 of the shift lever 14 can abut the upper surface of the cam plate 108 in parallel, without relation to the position of the pressed rod 102 in the lateral direction of the vehicle. Accordingly, in a case when the pressed rod 102 moves to the left side of the vehicle, the pressed rod 102 can vertically press the upper surface of the cam plate 108.

A lower portion of a quadrangular supporting plate 110 is fixed to the right end portion of the vehicle in the cylinder portion 106. The supporting plate 110 is able to integrally rotate with the cylinder portion 106. A rectangular parallelepiped stopper portion 112 corresponding to the stopper member is supported to an upper portion of the supporting plate 110. The stopper portion 112 is able to integrally rotate with the cylinder portion 106. The stopper portion 112 is disposed in the right side of the vehicle in the abutting portion 20 of the shift lever 14. The abutting portion 20 abuts the stopper portion 112 in this state, whereby it is possible to inhibit the shift lever 14 from being turned to the right side of the vehicle from the "P" shift position. Further, in a case when the shift lock member 104 is rotated in the direction of the arrow D as mentioned below, the abutting portion 20 does not abut the stopper portion 112. Accordingly, the shift lever 14 is allowed to be turned to the right side of the vehicle from the "P" shift position.

An upper portion of a connection plate 114 formed in a long plate shape and corresponding to the joint member is fixed to the left end portion of the vehicle in the cylinder portion 106. The connection plate 114 is able to integrally rotate with the cylinder portion 106. One end of the cable 50 is rotatably jointed to a lower portion of the connection plate 114. A moving force toward a direction of an arrow C in FIG. 8 (the side of the shift lever 14) is applied to the cable 50 on the basis of the energizing force applied to the shift lock member 104. The cable 50 is disposed at a position in the side opposing to the arrow C (a position shown in FIG. 8). Further, the cable 50 is able to move to a position in the side of the arrow C from a position in the side opposing to the arrow C according to the rotation of the shift lock member 104 to the direction of the arrow D.

In a case when the operation portion 78 of the brake 58 is pressed and the cable 50 disposed at the position in the side opposing to the arrow C is allowed to move to the position in the side of the arrow C in the same manner as that of the first embodiment, the shift lock member 104 is allowed to rotate. In this state, in a case when the shift lever 14 is turned to the right side of the vehicle from the "P" shift position, the pressed rod 102 of the shift lever 14 moves toward the right side of the vehicle while abutting the upper surface of the cam plate 108 of the lock member 104, on the basis of the energizing force applied to the shift lock member 104. The structure is made such that the shift lock member 104 is thereby rotated in the direction of the arrow D.

Further, the shift lock system is constructed by the shift lever apparatus 100, the brake 58, the key cylinder 52 and the like.

Next, a description will be given of an operation of the present embodiment.

The shift lever apparatus 100 having the structure mentioned above is provided with a shift lock mechanism. According to a shift lock method of the shift lever apparatus 100, the cable 50 disposed at the position in the side opposing to the arrow C is inhibited from moving to the position in the side of the arrow C in the same manner as that of the first embodiment, unless the operation portion 78 of the brake 58 is not pressed in a case when the shift lever 14 is positioned at the "P" shift position. Accordingly, the shift lock member 104 is inhibited from rotating in the direction of the arrow D according to the energizing force, and it is possible to maintain the state in which the stopper portion 112 of the shift lock member 104 is disposed in the right side of the vehicle in the abutting portion 20 of the shift lever 14. Accordingly, the abutting portion 20 abuts the stopper portion 112, whereby the shift lever 14 is inhibited from turning to the right side of the vehicle. Therefore, the shift lever 14 is inhibited from being changed from the "P" shift position to the "R" shift position.

On the contrary, the cable 50 disposed at the position in the side opposing to the arrow C is allowed to move to the position in the side of the arrow C in the same manner as that of the first embodiment, if the operation portion 78 of the brake 58 is pressed in a case when the shift lever 14 is positioned at the "P" shift position, and the shift lock member 104 is allowed to rotate according to the energizing force. Accordingly, the pressed rod 102 of the shift lever 14 moves toward the right side of the vehicle while abutting the upper surface of the cam plate 108 of the shift lock member 104 on the basis of the energizing force applied to the shift lock member 104, in accordance that the shift lever 14 turns from the "P" shift position to the right side of the vehicle. Therefore, the shift lock member 104 rotates in the direction of the arrow D (at the same time, the cable 50 is moved to the position in the side of the arrow C from the position in the side opposing to the arrow C). Accordingly, the abutting portion 20 of the shift lever 14 does not abut the stopper portion 112 of the shift lock member 104, and the shift lever 14 is allowed to be turned to the right side of the vehicle. Accordingly, the shift lever 14 is allowed to be changed from the "P" shift position to the "R" shift position.

Further, the shift lever apparatus 100 is provided with a key interlock mechanism. In a case when the shift lever 14 is positioned at the "P" shift position, the pressed rod 102 of the shift lever 14 abuts the left end portion of the vehicle in the upper surface of the cam plate 108 of the shift lock member 104, and the cable 50 is disposed at the position in the side opposing to the arrow C. Accordingly, the ignition key can be taken out from the key cylinder 52 in the same manner as that of the first embodiment.

On the contrary, in a case when the shift lever 14 is positioned at the other positions than the "P" shift position, the pressed rod 102 of the shift lever 14 does not abut the upper surface of the cam plate 108 of the shift lock member 104. Accordingly, the cable 50 is disposed at the position in the side of the arrow C according to the moving force of the cable 50 toward the direction of the arrow C which is generated by the energizing force toward the direction of the arrow D applied to the shift lock member 104. Therefore, the ignition key cannot be taken out from the key cylinder 52 in the same manner as that of the first embodiment.

Furthermore, the moving force toward the direction of the arrow C is applied to the cable 50 by applying the energizing force toward the direction of the arrow D to the shift lock member 104. Therefore, in a case when the shift lever 14 is positioned at the other positions than the "P" shift position, it is possible to securely dispose the cable 50 at the position in the side of the arrow C according to this moving force.

Further, in a case when turning the shift lever 14 to the left side of the vehicle for the purpose of changing the shift lever 14 from the "R" shift position to the "P" shift position, the pressed rod 102 of the shift lever 14 moves to the left side of the vehicle according to the turning of the shift lever 14 to the left side of the vehicle. Accordingly, the upper surface of the cam plate 108 in the shift lock member 104 is pressed, and the shift lock member 104 is rotated in the direction opposing to the arrow D against the energizing force (at the same time, the cable 50 is moved to the position in the side opposing to the arrow C from the position in the side of the arrow C). Therefore, the stopper portion 112 of the shift lock member 104 is disposed in the right side portion of the vehicle in the abutting portion 20 of the shift lever 14.

In the manner mentioned above, in the shift lever apparatus 100 according to the present embodiment, the same effect as that of the first embodiment mentioned above can be also obtained.

(Modified Embodiment)

Figure 9:
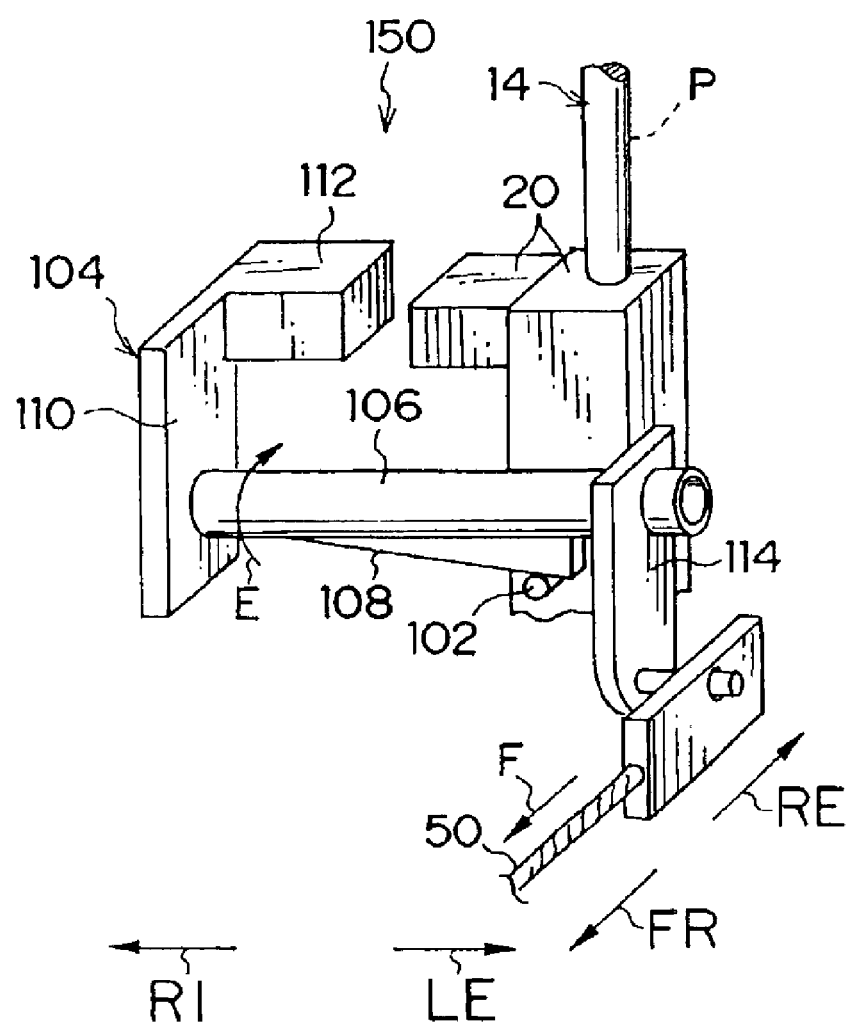
FIG. 9 is a perspective view as seen from a left oblique front side of a vehicle which shows a main portion of a shift lever apparatus according to a modified embodiment of the second embodiment.

In FIG. 9, there is shown a main portion of a shift lever apparatus 150 according to a modified embodiment of the second embodiment of the invention in a form of a perspective view as seen from a left oblique front side of a vehicle.

In the shift lever apparatus 150 according to the present embodiment, the pressed rod 102 of the shift lever 14 protrudes to a front side of the vehicle from the abutting portion 20, in the lower side of the cylinder portion 106 of the shift lock member 104.

The shift lock member 104 is energized toward a direction of an arrow E in FIG. 9. Accordingly, a moving force toward a direction of an arrow F in FIG. 9 (the side opposing to the shift lever 14) is applied to the cable 50 according to the energizing force applied to the shift lock member 104. Further, the cable 50 is disposed at a position in the side opposing to the arrow F (a position shown in FIG. 9) corresponding to a first position. The cable 50 is able to move to the position in the side of the arrow F corresponding to a second position from the position in the side opposing to the arrow F according to the rotation of the shift lock member 104 in the direction of the arrow F. Further, the cable 50 is structured such that the cable 50 cannot move in the direction of the arrow F over the position in the side of the arrow F.

In the shift lock member 104, the cam plate 108 is integrally provided in the lower portion of the cylinder portion 106. The lower surface of the cam plate 108 is formed in a slant surface which is inclined upward toward the right side of the vehicle. A left end portion of the vehicle in the lower surface of the cam plate 108 abuts the pressed rod 102 of the shift lever 14 positioned at the "P" shift position, according to the energizing force applied to the shift lock member 104. Further, in a case when the shift lock member 104 is rotated in the direction of the arrow E in the manner mentioned below, the abutting portion 20 does not abut the stopper portion 112. Accordingly, the shift lever 14 is allowed to be turned to the right side of the vehicle from the "P" shift position.

Further, the cam plate 108 is disposed at a position which is displaced to the rear side of the vehicle with respect to a center axis of the cylinder portion 106. Accordingly, in a case when the pressed rod 102 of the shift lever 14 moves to the left side of the vehicle so as to press the lower surface of the cam plate 108, the shift lock member 104 is able to rotate in the direction opposing to the arrow E against the energizing force. Further, the lower surface of the cam plate 108 is inclined upward toward the rear side of the vehicle so that an angle of incline becomes greater step by step in accordance that the upper surface is close to the right side of the vehicle. Therefore, the pressed rod 102 of the shift lever 14 can abut the lower surface of the cam plate 108 in parallel, without relation to the position of the pressed rod 102 in the lateral direction of the vehicle. Accordingly, in a case when the pressed rod 102 moves to the left side of the vehicle, the pressed rod 102 can vertically press the lower surface of the cam plate 108.

Figure 10:
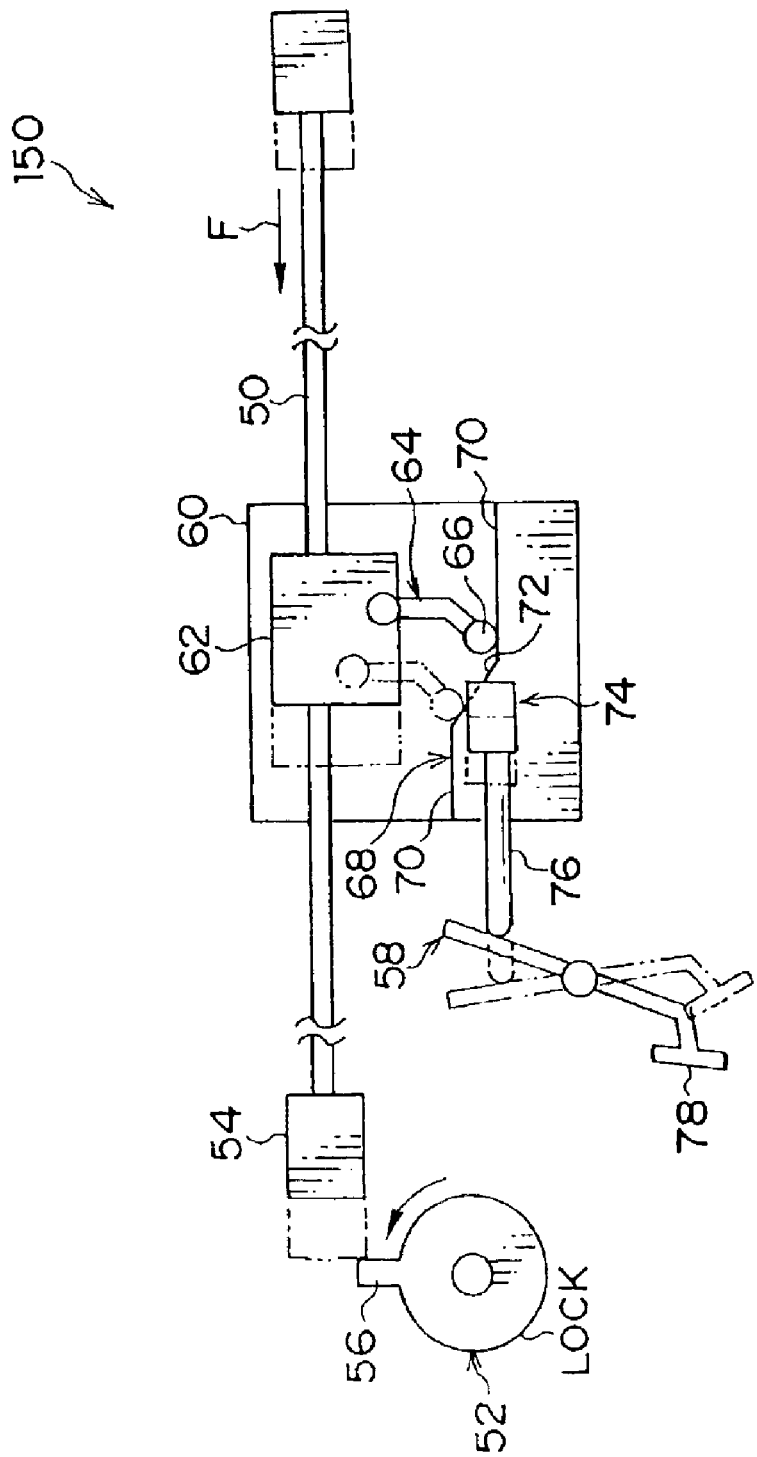
FIG. 10 is a schematic view which shows a connection state of a cable in the shift lever apparatus according to the modified embodiment of the second embodiment.

As shown in FIG. 10, the key lock member 54 at the other end of the cable 50 moves in a direction moving close to the key cylinder 52 together with the movement of the cable 50 in a direction of an arrow F (the side opposing to the shift lever 14). In this case, the cable 50 is disposed at the position in the side opposing to the arrow F as mentioned above. Accordingly, the engagement projection 56 of the key cylinder 52 does not abut the key lock member 54, and the ignition key is allowed to be rotated to the "LOCK" position. On the contrary, in a case when the cable 50 is disposed at the position in the side of the arrow F, the engagement projection 56 abuts the key lock member 54. Therefore, the ignition key is inhibited from being rotated to the "LOCK" position.

The case 60 is provided in the side opposing to the arrow F in the brake 58. The slant surface 72 on the guiding surface 68 within the case 60 is inclined upward toward the direction of the arrow F. In this case, the cable 50 is disposed at the position in the side opposing to the arrow F as mentioned above. Therefore, the pulley 66 of the supporting member 64 is disposed on the horizontal surface 70 in the lower side. On the contrary, in a case when the cable 50 is disposed at the position in the side of the arrow F, the supporting member 64 is moved upward with respect to the moving member 62, and the pulley 66 of the supporting member 64 moves upward on the slant surface 72 so as to be disposed on the upper portion of the slant surface 72 (or the horizontal surface 70 in the upper side).

The inhibiting member 74 within the case 60 is provided in the side of the arrow F in the slant surface 72. The extension portion 76 of the inhibiting member 74 extends out of the case 60 toward the brake 58 (the side of the arrow F). The inhibiting member 74 is energized toward the brake 58. Accordingly, the extension portion 76 abuts the upper portion of the brake 58 according to this energizing force.

In a case when the operation portion 78 of the brake 58 is not pressed, the inhibiting member 74 protrudes out from the slant surface 72. Accordingly, the pulley 66 of the supporting member 64 abuts the inhibiting member 74, and the pulley 66 is inhibited from moving to the upper side of the slant surface 72. Therefore, the cable 50 disposed at the position in the side opposing to the arrow F is inhibited from moving to the position in the side of the arrow F.

On the contrary, in a case when the operation portion 78 of the brake 58 is pressed, the extension portion 76 follows the rotation of the upper portion in the brake 58 according to the energizing force. Accordingly, the inhibiting member 74 moves to the side of the brake 58 and does not protrude from the slant surface 72, whereby the pulley 66 of the supporting member 64 is allowed to move to the upper side of the slant surface 72. Thus, the cable 50 disposed at the position in the side opposing to the arrow F is allowed to move to the position in the side of the arrow F, and the shift lock member 104 is allowed to rotate. In a case when the shift lever 14 is turned to the right side of the vehicle from the "P" shift position in this state, the pressed rod 102 of the shift lever 14 moves toward the right side of the vehicle while abutting the lower surface of the cam plate 108 in the shift lock member 104, according to the energizing force applied to the shift lock member 104. The structure is made such that the shift lock member 104 is thereby rotated in the direction of the arrow E.

Further, the shift lock system is constructed by the shift lever apparatus 150, the brake 58, the key cylinder 52 and the like.

Next, a description will be given of an operation of the present modified embodiment.

The shift lever apparatus 150 having the structure mentioned above is provided with a shift lock mechanism. According to a shift lock method of the shift lever apparatus 150, the inhibiting member 74 protrudes from the slant surface 72 unless the operation portion 78 of the brake 58 is not pressed in a case when the shift lever 14 is positioned at the "P" shift position. Accordingly, the pulley 66 of the supporting member 64 abuts the inhibiting member 74, and the pulley 66 is inhibited from moving to the upper side of the slant surface 72. Then, the cable 50 disposed at the position in the side opposing to the arrow F is inhibited from moving to the position in the side of the arrow F. Accordingly, the shift lock member 104 is inhibited from rotating in the direction of the arrow E according to the energizing force. Therefore, it is possible to maintain the state in which the stopper portion 112 of the shift lock member 104 is disposed in the right side of the vehicle in the abutting portion 20 of the shift lever 14. Accordingly, the abutting portion 20 abuts the stopper portion 112, whereby the shift lever 14 is inhibited from turning to the right side of the vehicle. Therefore, the shift lever 14 is inhibited from being changed from the "P" shift position to the "R" shift position.

On the contrary, the inhibiting member 74 moves to the side of the brake 58 according to the energizing force together with the rotation of the upper portion of the brake 58 and does not protrude from the slant surface 72 if the operation portion 78 of the brake 58 is pressed in a case when the shift lever 14 is positioned at the "P" shift position. Accordingly, the pulley 66 of the supporting member 64 is allowed to move to the upper side of the slant surface 72, and the cable 50 disposed at the position in the side opposing to the arrow F is allowed to move to the position in the side of the arrow F. Accordingly, the shift lock member 104 is allowed to rotate according to the energizing force. Therefore, the pressed rod 102 of the shift lever 14 moves toward the right side of the vehicle while abutting the lower surface of the cam plate 108 in the shift lock member 104 by the energizing force applied to the shift lock member 104, according to the turning of the shift lever 14 from the "P" shift position to the right side of the vehicle. Accordingly, the shift lock member 104 rotates in the direction of the arrow E (at the same time, the cable 50 is moved to the position in the side of the arrow F from the position in the side opposing to the arrow F). Accordingly, the abutting portion 20 of the shift lever 14 does not abut the stopper portion 112 of the shift lock member 104, and the shift lever 14 is allowed to be turned to the right side of the vehicle. Accordingly, the shift lever 14 is allowed to be changed from the "P" shift position to the "R" shift position.

Further, the shift lever apparatus 150 is provided with a key interlock mechanism. In a case when the shift lever 14 is positioned at the "P" shift position, the pressed rod 102 of the shift lever 14 abuts the left end portion of the vehicle in the lower surface of the cam plate 108 in the shift lock member 104. Accordingly, the cable 50 is disposed at the position in the side opposing to the arrow F. Therefore, the engagement projection 56 of the key cylinder 52 does not abut the key lock member 54 at the other end of the cable 50, and the ignition key is allowed to be rotated to the "LOCK" position. Accordingly, the ignition key can be taken out from the key cylinder 52.

On the contrary, in a case when the shift lever 14 is positioned at the other positions than the "P" shift position, the pressed rod 102 of the shift lever 14 does not abut the lower surface of the cam plate 108 in the shift lock member 104. Accordingly, the cable 50 is disposed at the position in the side of the arrow F according to the moving force of the cable 50 toward the direction of the arrow F which is generated by the energizing force toward the direction of the arrow E applied to the shift lock member 104. Therefore, the engagement projection 56 of the key cylinder 52 abuts the key lock member 54 at the other end of the cable 50, and the ignition key is inhibited from rotating to the "LOCK" position. Therefore, the ignition key cannot be taken out from the key cylinder 52.

Furthermore, the moving force toward the direction of the arrow F is applied to the cable 50 by applying the energizing force toward the direction of the arrow E to the shift lock member 104. Therefore, in a case when the shift lever 14 is positioned at the other positions than the "P" shift position, it is possible to securely dispose the cable 50 at the position in the side of the arrow F according to this moving force.

Further, in a case when turning the shift lever 14 to the left side of the vehicle for the purpose of changing the shift lever 14 from the "R" shift position to the "P" shift position, the pressed rod 102 of the shift lever 14 moves toward the left side of the vehicle according to the turning of the shift lever 14 to the left side of the vehicle. Accordingly, the lower surface of the cam plate 108 in the shift lock member 104 is pressed, and the shift lock member 104 is rotated in the direction opposing to the arrow E against the energizing force (at the same time, the cable 50 is moved to the position in the side opposing to the arrow F from the position in the side of the arrow F). Therefore, the stopper portion 112 of the shift lock member 104 is disposed in the right side portion of the vehicle in the abutting portion 20 of the shift lever 14.

In the manner mentioned above, in the shift lever apparatus 150 according to the present modified embodiment, the same effect as that of the first embodiment mentioned above can be also obtained.

In this case, in the first embodiment and the second embodiment (including the modified embodiment) mentioned above, the structure is made such that the shift lever apparatus 10, 100 or 150 is provided with the shift lock mechanism and the key interlock mechanism. However, the structure may be made such that the shift lever apparatus is provided with only one of the shift lock mechanism and the key interlock mechanism (does not use the functions of the shift lock mechanism or the function of the key interlock mechanism).

Further, in the first embodiment and the second embodiment (including the modified embodiment) mentioned above, the structure is made such as to commonly use the cable 50 which connects the shift lever 14 and the ignition key as the cable 50 which connects the shift lever 14 and the brake 58. However, the structure may be made such that the cable which connects the shift lever and the ignition key, and the cable which connects the shift lever and the brake are separated.

[Third Embodiment]

Figure 11:
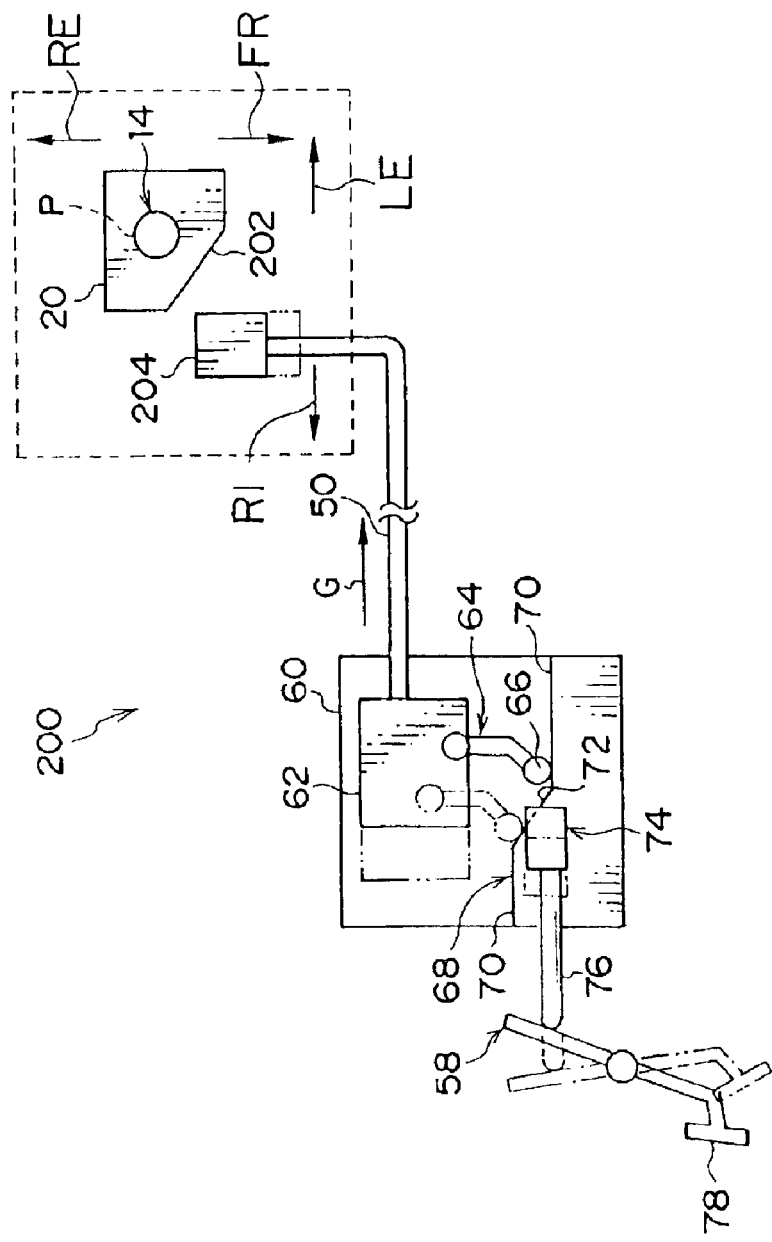
FIG. 11 is a schematic view which shows a main portion of a shift lever apparatus according to a third embodiment.

In FIG. 11, there is shown a main portion of a shift lever apparatus 200 according to a third embodiment of the invention in a form of a schematic view.

The shift lever apparatus 200 according to the present embodiment has substantially the same structure as that of the shift lever apparatus 10 according to the first embodiment mentioned above, however, is different in the following points.

A slant surface 202 is formed in the abutting portion 20 of the lower portion of the shift lever 14. The slant surface 202 is inclined toward the right side of the vehicle and the rear side of the vehicle.

The stopper link 24 and the cable link 40 according to the first embodiment are not provided, and a shift lock member 204 serving as the moving mechanism is disposed in the right side of the vehicle in the shift lever 14 which is positioned at the "P" shift position. One end of the cable 50 is jointed to the shift lock member 204. An energizing force (a moving force) toward a direction of an arrow G in FIG. 11 (in the side of the shift lever 14) is applied to the shift lock member 204 and the cable 50. Accordingly, the shift lock member 204 and the cable 50 are disposed at a position in the side of the arrow G corresponding to a first position (a position at which the shift lock member 204 is disposed in the right side of the vehicle in the slant surface 202). Further, in a case when the shift lever 14 is turned to the right side of the vehicle from the "P" shift position in the manner mentioned below, the shift lock member 204 and the cable 50 can be disposed at a position in the side opposing to the arrow G corresponding to a second position (a position at which the shift lock member 204 is in contact with the front side of the vehicle in the abutting portion 20). Further, the shift lock member 204 and the cable 50 are structured such that they cannot move to the direction of the arrow G over the position in the side of the arrow G.

The cable 50 connects only the shift lever 14 and the brake 58, and does not connect the shift lever 14 and the ignition key.

The case 60 is provided in the side of the arrow G in the brake 58. The slant surface 72 on the guiding surface 68 within the case 60 is inclined upward toward the direction opposing to the arrow G. In this case, the cable 50 is disposed at the position in the side of the arrow G as mentioned above. Therefore, the pulley 66 of the supporting member 64 is disposed on the horizontal surface 70 in the lower side. On the contrary, in a case when the cable 50 is disposed at the position in the side opposing to the arrow G, the supporting member 64 is moved upward with respect to the moving member 62, and the pulley 66 of the supporting member 64 moves upward on the slant surface 72 so as to be disposed on the upper portion of the slant surface 72 (or the horizontal surface 70 in the upper side).

The inhibiting member 74 within the case 60 is provided in the side opposing to the arrow G in the slant surface 72. The extension portion 76 of the inhibiting member 74 extends out of the case 60 toward the brake 58 (the side opposing to the arrow G). The inhibiting member 74 is energized toward the brake 58. Accordingly, the extension portion 76 abuts the upper portion of the brake 58 according to this energizing force.

In a case when the operation portion 78 of the brake 58 is not pressed, the inhibiting member 74 protrudes out from the slant surface 72. Accordingly, the pulley 66 of the supporting member 64 abuts the inhibiting member 74, and the pulley 66 is inhibited from moving to the upper side of the slant surface 72. Therefore, the cable 50 and the shift lock member 204 disposed at the position in the side of the arrow G are inhibited from moving to the position in the side opposing to the arrow G. In a case when the shift lever 14 is turned to the right side of the vehicle from the "P" shift position in this state, the abutting portion 20 (the slant surface 202) of the shift lever 14 abuts the shift lock member 204. Accordingly, the shift lever 14 is inhibited from being turned to the right side of the vehicle.

On the contrary, in a case when the operation portion 78 of the brake 58 is pressed, the extension portion 76 follows the rotation of the upper portion in the brake 58 according to the energizing force. Accordingly, the inhibiting member 74 moves to the side of the brake 58 and does not protrude from the slant surface 72, whereby the pulley 66 of the supporting member 64 is allowed to move to the upper side of the slant surface 72. Thus, the cable 50 and the shift lock member 204 disposed at the position in the side in the arrow G are allowed to move to the position in the side opposing to the arrow G. In a case when the shift lever 14 is turned to the right side of the vehicle from the "P" shift position in this state, the shift lock member 204 is pressed by the slant surface 202 of the shift lever 14, and the shift lock member 204 and the cable 50 are moved to the position in the side opposing to the arrow G. The structure is made such that the shift lever 14 is thereby allowed to be turned to the right side of the vehicle.

Further, the shift lock system is constructed by the shift lever apparatus 200, the brake 58 and the like.

Next, a description will be given of an operation of the present embodiment.

The shift lever apparatus 200 having the structure mentioned above is provided with a shift lock mechanism. According to a shift lock method of the shift lever apparatus 200, the inhibiting member 74 protrudes from the slant surface 72 unless the operation portion 78 of the brake 58 is not pressed in a case when the shift lever 14 is positioned at the "P" shift position. Accordingly, the pulley 66 of the supporting member 64 abuts the inhibiting member 74, and the pulley 66 is inhibited from moving to the upper side of the slant surface 72. Then, the cable 50 disposed at the position in the side of the arrow G is inhibited from moving to the position in the side opposing to the arrow G, and it is possible to maintain the state in which the shift lock member 204 is disposed at the position in the side of the arrow G. Accordingly, the abutting portion 20 (the slant surface 202) of the shift lever 14 abuts the shift lock member 204, whereby the shift lever 14 is inhibited from turning to the right side of the vehicle. Therefore, the shift lever 14 is inhibited from being changed from the "P" shift position to the "R" shift position.

On the contrary, the inhibiting member 74 moves to the side of the brake 58 according to the energizing force together with the rotation of the upper portion of the brake 58 and does not protrude from the slant surface 72 if the operation portion 78 of the brake 58 is pressed in a case when the shift lever 14 is positioned at the "P" shift position. Accordingly, the pulley 66 of the supporting member 64 is allowed to move to the upper side of the slant surface 72, and the shift lock member 204 and the cable 50 which are disposed at the position in the side of the arrow G are allowed to move to the position in the side opposing to the arrow G. Therefore, the slant surface 202 of the shift lever 14 presses the shift lock member 204, according to the turning of the shift lever 14 from the "P" shift position to the right side of the vehicle, and the shift lock member 204 and the cable 50 are moved to the position in the side opposing to the arrow G. Therefore, the shift lever 14 is allowed to be turned to the right side of the vehicle, and the shift lever 14 is allowed to be changed from the "P" shift position to the "R" shift position.

In the manner mentioned above, even in the shift lever apparatus 200 according to the present embodiment, it is possible to obtain the same effect as the effect obtained by the shift lock mechanism according to the first embodiment mentioned above.

Further, in a case when changing the shift lever 14 from the "R" shift position to the "P" shift position, the pulley 66 of the supporting member 64 is allowed to move to the upper side of the slant surface 72 by pressing the operation portion 78 of the brake 58. Accordingly, the shift lock member 204 and the cable 50 are allowed to move to the position in the side opposing to the arrow G. Therefore, it is possible to prevent the turning of the shift lever 14 to the front side of the vehicle and the left side of the vehicle from being inhibited by the shift lock member 204, in a case when the shift lever 14 is changed from the "R" shift position to the "P" shift position.

In this case, in the present embodiment, the structure is made such that the slant surface 202 is formed in the abutting portion 20 of the shift lever 14. However, in place of this or together with this, the structure may be made such that a slant surface which is inclined in the same direction as the slant surface 202 and can a but the abutting portion 20 is formed in the shift lock member 204.

Further, in the first embodiment, the second embodiment (including the modified embodiment) and the third embodiment mentioned above, the structure is made such that the shift lever apparatus 10, 100, 150 or 200 is placed on the floor surface 12 within the vehicle. However, the structure may be made such that the shift lever apparatus is placed in an instrument panel within the vehicle.

Further, in the first embodiment, the second embodiment (including the modified embodiment) and the third embodiment mentioned above, the direction of each of the energizing forces may be suitably changed, and the structure may be changed in correspondence therewith.

What is claimed is:

1. A shift lever apparatus comprising:
    a shift lever which is provided so as to be able to be turned in a predetermined direction and a side direction of the predetermined direction, wherein by being turned at least in the side direction of the predetermined direction, a shift position is changed from a predetermined shift position; and
    a connecting member, which connects the shift lever and a brake for braking a vehicle by being operated and is able to be moved between a first position, at which the turning of the shift lever to the side direction of the predetermined direction is inhibited, and a second position, at which the turning of the shift lever to the side direction of the predetermined direction is allowed, wherein, in a case when the shift lever is positioned at the predetermined shift position, and the brake is not operated, movement from the first position to the second position is inhibited, and in a case when the shift lever is positioned at the predetermined shift position, and the brake is operated, movement from the first position to the second position is allowed, and the connecting member is moved from the first position to the second position in accordance with the turning of the shift lever to the side direction of the predetermined direction.

2. A shift lever apparatus according to claim 1, wherein the connecting member connects the shift lever and an ignition key which can be taken out by being operated to a predetermined operating position, and, in a case when the shift lever is positioned at the predetermined shift position, the operation of the ignition key to the predetermined operating position is allowed by the connecting member being disposed at the first position, and in a case when the shift lever is positioned at a position other than the predetermined shift position, the operation of the ignition key to the predetermined operating position is inhibited by the connecting member being disposed at the second position.

3. A shift lever apparatus according to claim 1, wherein a moving force from the first position toward the second position is applied to the connecting member.

4. A shift lever apparatus according to claim 1, further comprising a shift lock member, which is jointed to a shift lever side of the connecting member, for inhibiting the shift lever from turning to the side direction of the predetermined direction in a case when the connecting member is disposed at the first position and for allowing the shift lever to turn in the side direction of the predetermined direction in a case when the connecting member is disposed at the second position.

5. A shift lever apparatus according to claim 4, wherein the shift lock member comprises:
    a joint member, which is jointed to the shift lever side of the connecting member, for being moved together with the movement of the connecting member; and
    a stopper member, which is provided so as to be able to be moved by the movement of the joint member and is disposed by the joint member at a position inhibiting the turning of the shift lever to the side direction of the predetermined direction in a case when the connecting member is disposed at the first position, and is disposed by the joint member at a position allowing the turning of the shift lever to the side direction of the predetermined direction in a case when the connecting member is disposed at the second position.

6. A shift lever apparatus according to claim 1, further comprising a returning member which is provided in the shift lever, and moves the connecting member from the second position to the first position in the case when the shift lever is changed to the predetermined shift position.

7. A shift lever apparatus according to claim 1, further comprising an inhibiting member which is provided so as to be able to be moved by the operation of the brake, wherein, the inhibiting member is disposed at a position inhibiting the connecting member from moving from the first position to the second position in the case when the brake is not operated, and is disposed at a position allowing the connecting member to move from the first position to the second position in the case when the brake is operated.

8. A shift lever apparatus according to claim 2, further comprising a key lock member which is jointed to an ignition key side of the connecting member, is disposed at a position for allowing the ignition key to be operated to the predetermined operating position in the case when the connecting member is disposed at the first position, and is disposed at a position for inhibiting the ignition key from being operated to the predetermined operating position in the case when the connecting member is disposed at the second position.

9. The shift lock system according to claim 1, further comprising:
a brake for being operated to brake a vehicle.

10. The shift lock system according to claim 9, further comprising a vehicle.

* * * * *